United States Patent [19]

Meyer

[11] 4,352,645
[45] Oct. 5, 1982

[54] SOLENOID PUMP ADAPTED FOR NOISELESS OPERATION

[75] Inventor: James H. M. Meyer, Rockford, Ill.

[73] Assignee: Sundstrand Corporation, Rockford, Ill.

[21] Appl. No.: 121,631

[22] Filed: Feb. 14, 1980

Related U.S. Application Data

[62] Division of Ser. No. 925,731, Jul. 18, 1978, Pat. No. 4,308,475.

[51] Int. Cl.³ .............................................. F04B 17/04
[52] U.S. Cl. ...................................... 417/417; 310/30
[58] Field of Search ..................... 417/417; 310/30, 34, 310/23

[56] References Cited

U.S. PATENT DOCUMENTS

| 496,331 | 4/1963 | Van Depoele | 417/417 X |
| 1,661,359 | 3/1928 | Chryst et al. | 417/417 |
| 1,690,348 | 11/1928 | Wallace | 417/417 X |
| 1,978,866 | 10/1934 | König | 417/417 |
| 2,149,545 | 3/1939 | Price | 417/417 |
| 4,157,168 | 6/1979 | Schlagmüller et al. | 251/52 |

FOREIGN PATENT DOCUMENTS

| 657789 | 3/1938 | Fed. Rep. of Germany | 310/30 |
| 2410768 | 9/1975 | Fed. Rep. of Germany | 417/417 |
| 2032594 | 11/1970 | France . | |
| 40-34214 | 11/1965 | Japan . | |
| 42-5619 | of 1967 | Japan . | |
| 47-12037 | of 1972 | Japan . | |
| 47-71228 | 6/1972 | Japan . | |
| 47-75048 | 6/1972 | Japan . | |
| 47-85025 | 7/1972 | Japan . | |
| 993390 | 5/1965 | United Kingdom . | |

Primary Examiner—Leonard E. Smith
Attorney, Agent, or Firm—Wegner, McCord, Wood & Dalton

[57] ABSTRACT

A solenoid-actuated hydraulic fluid pump having a reciprocable armature operable by a magnetic circuit and with dashpot structure to limit movement of the armature beyond a predetermined position to avoid noise-creating contact with another part of the pump.

3 Claims, 3 Drawing Figures

SOLENOID PUMP ADAPTED FOR NOISELESS OPERATION

CROSS-REFERENCE TO RELATED APPLICATION

This application is a division of U.S. Ser. No. 925,731, filed July 18, 1978, now U.S. Pat. No. 4,308,475.

BACKGROUND ART

U.S. Pat. Nos. 3,874,822 and 3,877,841 disclose one form of prior art solenoid-actuated fuel oil pump in which an electromagnetic plunger or armature surrounded by an electromagnetic coil is supported within a main pumping chamber by coil springs abutting opposite ends of the armature. Connected to the lower end of the armature is a pressure plunger or piston whose lower end telescopes into an intake pressure chamber. The latter is separated from the main pumping chamber by a check valve on the discharge side of the intake pressure chamber. Another check valve on the suction or inlet side of the intake pressure chamber keeps fluid from being pumped back through an inlet side of the intake pressure chamber. A half-wave rectified alternating current applied to the coil provides for intermittent energization of the coil because current flows only in one direction through the coil in a cycle. When current is flowing through the coil, the armature is driven upwardly to compress the upper one of the coil springs by the electromagnetic forces resulting from energization of the coil. Then, when current flow stops, the stored forces in the upper spring push the armature downwardly, its momentum propelling it past a neutral spring force position in the main pumping chamber thereby compressing the lower coil spring. As current is reapplied to the coils, the armature again is forced upwardly against the upper spring.

In the present solenoid pump as well as the prior art pump described above, the power stroke of the piston is with the upstroke of the armature so that, as the piston enters the main pumping chamber from the intake chamber, fuel oil is forced through a longitudinal passage in the armature and out of the main pumping chamber through a hole in a magnetic force adjusting rod or plug which also serves as the upper reaction member for the upper armature spring.

DISCLOSURE OF THE INVENTION

Under normal ideal operating conditions, the travel of the armature within the main pumping chamber is limited by the hydraulic load imposed on the pump. Accordingly, the armature springs are kept from being compressed excessively. It is desirable to avoid excessive compression of the armature springs because excessive compression can cause the springs to fail prematurely and thereby render the pump inoperative. Under actual operating conditions, however, air bubbles may pass through the pump or the pump may be subjected to a period of dry operation, resulting in a momentary or extended loss of hydraulic load on the pump. Such loss of hydraulic load can cause the armature to travel beyond its normal range of movement and, should the armature move upwardly to strike against a member, such as the magnetic force adjusting plug, the operation of the pump becomes undesirably noisy.

The present invention aims to eliminate the foregoing cause of noise from the operation of the solenoid pump by keeping the upper end of the armature from striking the plug yet without causing excessive compression of the armature springs by limiting upward movement of the armature to an overtravel position spaced below the lower end of the plug.

In accordance with the present invention, dashpot means are provided in the upper end of a main pumping chamber to coact between the upper end of the armature and an end plug to limit upward movement of the armature. Advantageously, herein, the dashpot is defined by a recess in the armature which retains both the lower end of an upper armature spring and a quantity of fuel oil. The plug has a lip sized to telescope within the recess in an overtravel position and thereby limit upward movement of the armature by damping flow of oil from the recess.

The foregoing and other advantageous effects of the present invention will become more apparent from the following description of the best mode of the invention when read in conjunction with the accompanying drawings.

BEST MODE FOR CARRYING OUT THE INVENTION

Figure 1:
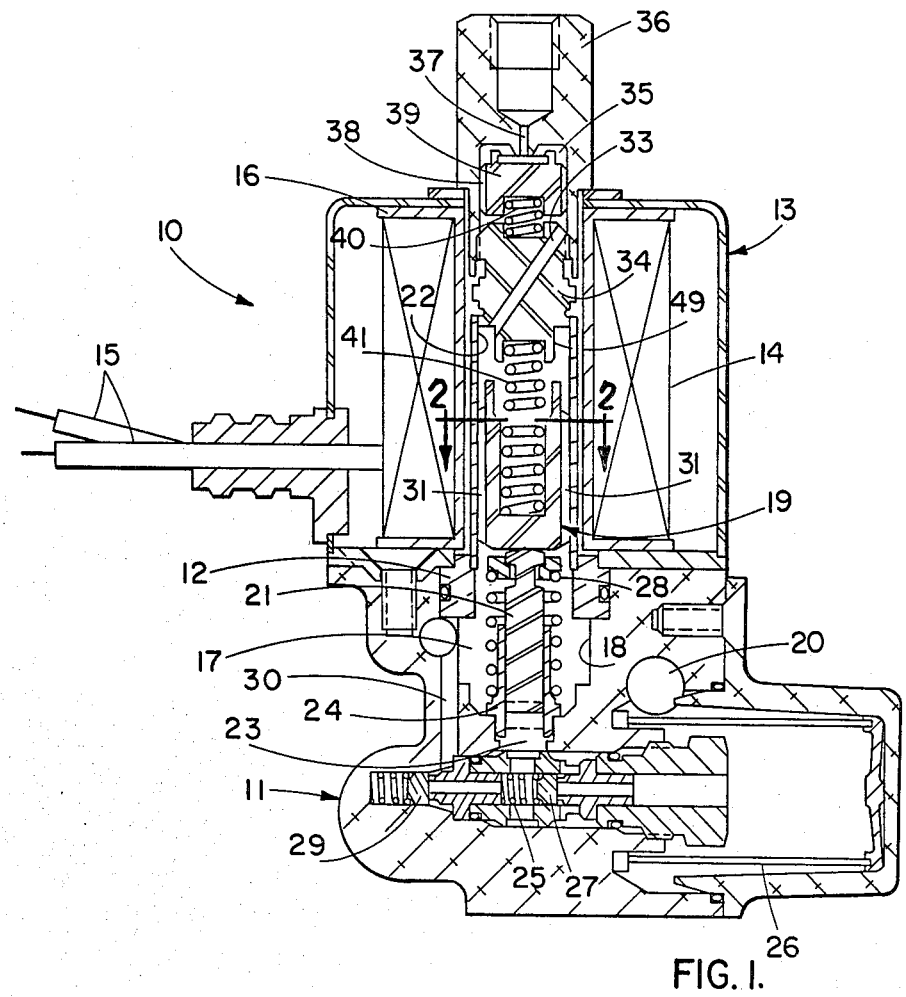
FIG. 1 is a cross-sectional view of a solenoid pump embodying the novel features of the present invention.

As shown in the drawings for purposes of illustration, the present invention is embodied in a solenoid-actuated hydraulic pump 10, such as may be used in pumping a low volume of fuel oil from a tank (not shown) to a burner nozzle (not shown) of a household furnace. Herein, the pump includes a body 11 with a magnetic housing 13 attached thereto and containing an electromagnetic coil 14. The coil is connectable through lead wires 15 to a source (not shown) of half-wave rectified alternating current which provides the power for the pump. More particularly, the coil is supported within the housing 13 on a nonmagnetic spool 16 which is attached to the inside surfaces of the housing. The central aperture of the spool as well as a recess 18 in the pump body define a pumping chamber 17 and a nonmagnetic sleeve 22 telescoped within the spool aperture and recess receives movable means including a generally cylindrical armature 19 adapted for reciprocation in the chamber with the intermittent energization of the coil 14 by the half-wave rectified current. A magnetic circuit in the pump is completed through the armature 19, an end plug 34 in the upper end of the main pumping chamber 17, the housing 13 and a sealing ring 12 connected to the housing and telescoped into sealing engagement with the recess 18.

In operation, hydraulic fluid in the form of fuel oil is drawn from the fuel tank (not shown) through an inlet bore 20 in the pump body with each upstroke of the armature 19. To provide the suction force for drawing in fuel oil through the bore 20, a smaller diameter piston or plunger 21 reciprocates with the armature within an intake chamber 23 that is separated from the main pumping chamber 17 by a cylinder 24. The lower end of the intake chamber 23 communicates with a passage 25 in turn communicable with bore 20 for delivering fuel oil to the intake chamber by way of an intake check valve 27. The piston 21 is formed separate from the armature 19, but is urged continuously against the lower end of the armature by a spring 28. A strainer 26 between the passage and the bore 20 provides for filtration of the incoming fuel oil and the intake check valve 27 which is spring loaded closed and is located upstream of the intake chamber in the passage 25 keeps fuel oil from flowing out of the intake chamber toward the strainer with each downstroke of the piston 21.

Immediately downstream of the intake chamber 23 within the passage 25 is located a discharge check valve 29 spring loaded closed and through which fuel is ported to a bore 30 communicating with the lower end of the main pumping chamber 17. Accordingly, with each downstroke of the piston 21 the volume of fluid previously drawn into the intake chamber 23 by upward movement of the piston between the upper and lower phantom line positions shown in FIG. 1, is pumped across the discharge check valve 29 and into the main pumping chamber. Then, with the next upstroke of the piston 21, the same volume of oil is driven from the main pumping chamber by the piston 21 as a portion of the piston enters the main pumping chamber from the intake chamber 23.

Figure 2:
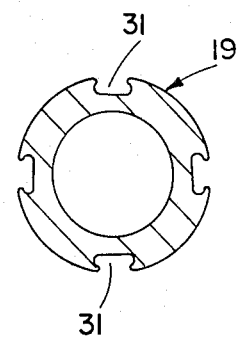
FIG. 2 is a cross-sectional view of the armature, taken substantially along line 2—2 of FIG. 1.

In flowing from the inlet end of the main pumping chamber 17 toward the upper outlet end of the chamber 17, the fuel oil passes through a series of peripheral slots or passages 31 formed in the armature 19 and extending longitudinally therethrough to open at opposite ends of the armature. As seen in FIG. 2, the slots also open radially of the armature. At the outlet end of the pumping chamber 17, the fuel oil passes through a hole 33 in the magnetic end plug 34 to a discharge chamber 35 defined by the discharge fitting 36 which threadably captivates the end plug 34 within the outlet end of the main pumping chamber 17. A discharge port 37 in the fitting 36 provides communication between the chamber 35 and an outlet conduit (not shown) leading to the fuel oil burner (not shown).

Reciprocal within the discharge chamber 35 is a magnetic valve 39 having peripheral slots 38 for fuel oil to pass by the sides of the valve within the chamber during pumping. But, as shown in FIG. 1, the valve is urged into a position closing the port 37 by a spring 40 acting between the valve 39 and the end plug 34. When the coil 14 initially is energized for normal pumping operation of the pump, the valve 39 is drawn downwardly against the end plug 34 by magnetic forces overcoming the spring 40. The magnetic hysteresis characteristics of the material forming the body of the valve 39 is such that the valve remains continuously open during the application of half-wave rectified current to the coil but, when the pump is turned off, the valve 39, of course, is urged into the closed position by the spring 40 to stop the flow of fuel out of the chamber 35.

In order for the armature 19 to reciprocate when half-wave rectified alternating current is applied to the coil 14 of the pump 10, the armature is urged downwardly by an upper spring 41 toward a neutral spring force position with spring 28. In this position, the reluctance across an air gap at the upper end of the armature is much greater than the reluctance in the portion of the flux path across the annular air gap adjacent the lower end of the armature. Accordingly, with the initial application of the half-wave rectified current to the coil 14, the armature is drawn upwardly by magnetic force as long as current flows through the coil due to the fact that the initial upward movement of the armature will tend to reduce the over-all reluctance of the magnetic circuit. Because current flows through the coil in only one direction during a cycle, the spring 41 causes the armature to downstroke once with each current cycle. Thus, for instance, with the sixty-cycle current, the armature and accompanying piston 21 reciprocate sixty times within each second. However, in part because of the momentum generated by the moving parts of the pump, reversal in the direction of movement of the armature at the upper end of its stroke does not occur instantaneously with the loss of current flow through the coil 14. But normally, owing to the damping effect of the oil flowing through the armature passages 31 and the work being performed by the pump in pressurizing the oil, normal upward movement of the armature under hydraulic load is limited to avoid striking the upper end of the armature against the lower end of the plug 34. However, from time to time during operation of the fuel pump of the present character, an air bubble may be transmitted through the pump or the pump may be subjected to dry operation such that the armature does not stroke against a significant, if any, hydraulic load. Under such conditions, the armature will travel upwardly beyond from its normal limits of reciprocation. Repeated, excessive compression of the operating springs of the pump can lead to spring fatigue and pump failure and, should the upper end of the armature strike against the plug 40 undesirable operating noise is generated.

Figure 3:
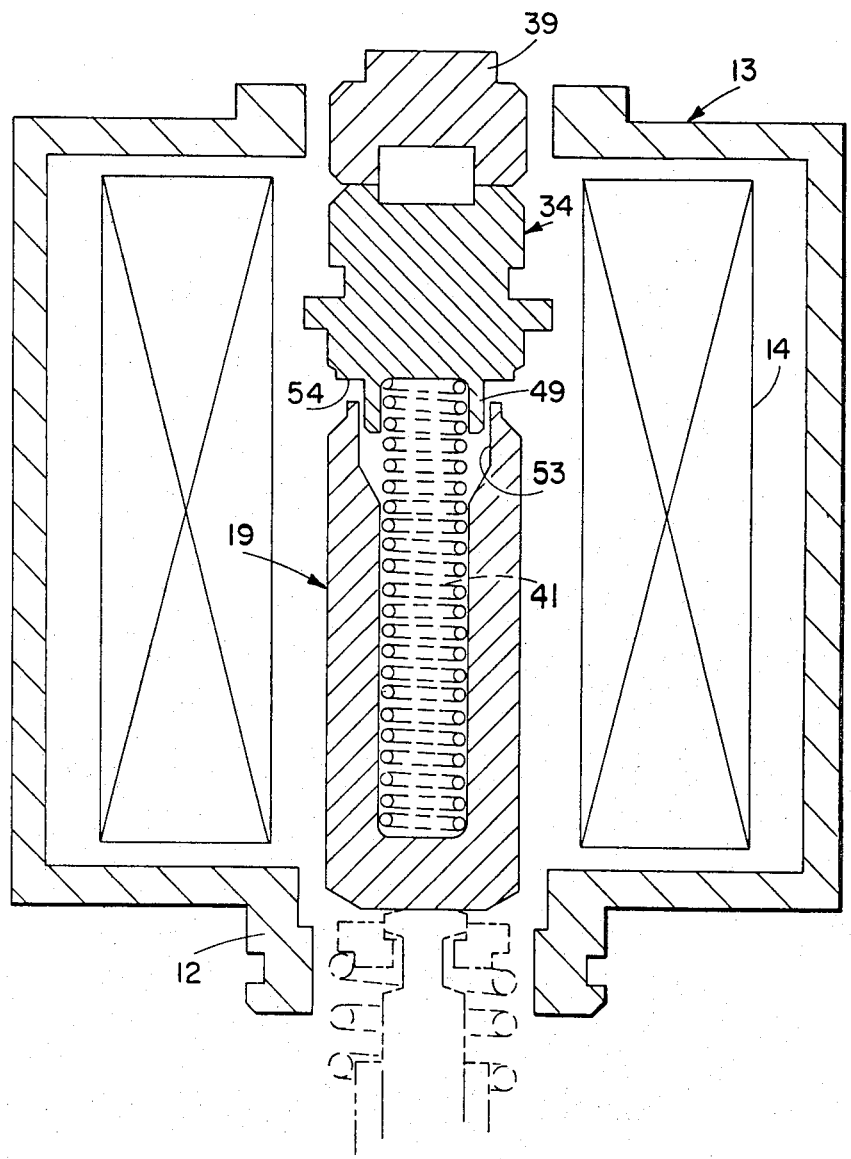
FIG. 3 is an enlarged, fragmentary, cross-sectional view, similar to FIG. 1 but showing some magnetic components of the pump in moved positions and nonmagnetic parts in phantom.

The present invention contemplates limiting upward movement of the armature 19 to the overtravel position (see FIG. 3) through the provision of dashpot means in the upper end of the main pumping chamber 17. For this purpose, the armature is formed with an elongated, generally cylindrical recess or reservoir 53 (see FIG. 3) of the same general cross-sectional configuration but slightly larger than the lateral cross-sectional area bounded by the radially outward surface of an annular lip 49. The annular lip 49 is integrally formed with and extends downwardly from the lower end of the plug 34. An additional function thereof is to serve as a retainer for the upper end of the spring 41. The lower end of the recess is closed so that during normal operation of the pump, oil collects in the reservoir 50. However, should an air bubble pass through the pumping chamber 17 causing the armature to overtravel, the armature is limited in upward movement beyond a normal upper limit to an overtravel position spaced below a lower end surface 54 of the plug 34 by the damping effect produced by the oil as it is forced between the exterior of the annular lip 49 and the inside walls of the reservoir.

In view of the foregoing, it is seen that the present invention brings to the art a new and improved solenoid pump 10 particularly constructed to keep from generating noise or excessively compressing the upper spring 41 in the absence of a hydraulic load.

I claim:

1. In a solenoid-actuated hydraulic pump including means defining a pumping chamber having inlet and outlet ends, movable means mounted within said pumping chamber and adapted for reciprocation in an axial direction between normal upper and lower limits under hydraulic load to pump fluid through the chamber, said movable means including an armature, a magnetic coil associated with said armature and operable when energized to move said armature, the improvement in said solenoid-actuated fuel pump being defined by said armature being solid with peripheral longitudinal slots to permit flow between said inlet and outlet ends and by hydraulic dashpot means including a fluid-holding recess in an upper end of the armature for limiting movement of the armature beyond said normal upper limit.

2. A solenoid-actuated pump as defined by claim 1 wherein said hydraulic dashpot means includes an oil reservoir in said armature opening upwardly thereof, a member within the upper end of said pumping chamber above said armature, a lip projecting downwardly from said member to telescope within said reservoir when said armature overtravels its normal upper limit thereby to dampen upward movement of the armature.

3. In a solenoid-actuated liquid fuel pump including means defining a pumping chamber having inlet and outlet ends, movable means mounted within said pumping chamber and adapted for reciprocation in an axial direction between normal upper and lower limits under hydraulic load to pump fuel through the chamber, said movable means including an armature which is solid with peripheral longitudinal slots to permit flow between said inlet and outlet ends, a magnetic coil associated with said armature and operable when energized to move said armature, a source of current connectable with said coil for intermittently energizing the coil, magnetic circuit means defining a magnetic flux path around said coil when energized, and dashpot means for limiting movement of the armature beyond said normal upper limit including a liquid reservoir in said armature opening upwardly from an upper end thereof for holding liquid fuel supplied from the pumping chamber, a member within the upper end of said pumping chamber above said armature, an annular lip projecting downwardly from said member and of a size to loosely telescope within said reservoir when said armature overtravels its normal upper limit thereby to force liquid out of the reservoir at a limited rate and dampen upward movement of the armature.

* * * * *